United States Patent [19]

Oprescu et al.

[11] Patent Number: 5,467,464
[45] Date of Patent: Nov. 14, 1995

[54] ADAPTIVE CLOCK SKEW AND DUTY CYCLE COMPENSATION FOR A SERIAL DATA BUS

[75] Inventors: Florin Oprescu, Sunnyvale; Roger Van Brunt, San Francisco, both of Calif.

[73] Assignee: Apple Computer, Inc., Cupertino, Calif.

[21] Appl. No.: 28,387

[22] Filed: Mar. 9, 1993

[51] Int. Cl.[6] .................................................. H03K 5/13
[52] U.S. Cl. ................................ 395/550; 364/DIG. 1; 364/271; 364/271.4
[58] Field of Search .................................................. 395/550

[56] References Cited

U.S. PATENT DOCUMENTS 5,122,679  6/1992  Ishii et al. .

FOREIGN PATENT DOCUMENTS 0173521  3/1986  European Pat. Off. .
0356042  2/1990  European Pat. Off. .
0369365  5/1990  European Pat. Off. .

Primary Examiner—Kevin A. Kriess
Attorney, Agent, or Firm—Blakely, Sokoloff, Taylor & Zafman

[57] ABSTRACT

The de-skewer utilizes a delay line to generate a set of delayed versions of an input clock signal. A bank of flip-flops compares pulses within the delayed clock signals to a synchronization pulse provided within an input data signal. A detector receives outputs from the flip-flops and selects the delayed clock signal having the least amount of skew based on the values of the output from the flip-flops. A multiplexer outputs the selected delayed clock. The de-skewer provides a simple, open-loop circuit for eliminating skew between parallel transmission paths. The de-skewer is ideally suited for eliminating skew from sources which do not vary significantly as a function of time. In particular, the de-skewer is well-suited for use in a data transmission system providing short bursts of high data rate transmissions. A double-edged de-skewer is also described which is capable of generating a pair of clock signals for use in eliminating duty cycle distortion.

16 Claims, 9 Drawing Sheets

ADAPTIVE CLOCK SKEW AND DUTY CYCLE COMPENSATION FOR A SERIAL DATA BUS

BACKGROUND OF THE INVENTION

1. Field of the Invention

The present invention generally relates to data buses for use in transmitting data between computer devices and, in particular, relates to a technique for minimizing signal skew between a data signal and a clock signal received along independent paths using a data bus.

2. Description of Related Art

Data buses are commonly employed for transmitting data, commands, clock signals or other information between computer devices, such as between a computer and its peripheral equipment, or between components within a single computer. To properly receive data transmitted over a data bus, the receiving device must have the capability of determining the synchronization of the data signal. Hence, a data bus typically transmits not only a data signal but a clock or synchronization signal to allow the receiving device to properly receive and decode the transmitted data.

Although a wide variety of techniques have been developed for transmitting a clock signal along with a data signal, a commonly used technique is to employ a pair of parallel paths, one for transmitting the data signal, the other for transmitting a synchronizing clock signal. Typically, a pair of transmission lines or cables are utilized in tandem with the data transmitted over a first cable with the clock signal transmitted over a second cable.

When the data signal and the clock signal are transmitted over separate paths, the transmission time from transmitter to receiver may vary according to the path. Thus, the clock signal may be delayed or advanced with respect to the data signal, or vice versa. This phenomenon, commonly referred to as skew, may affect the ability of the receiver to properly receive or to decode the data received along the data line.

Parallel path skew is illustrated in FIGS. 1 and 2. FIG. 1 provides a block diagram of a highly simplified serial data bus 10 for receiving a data signal along data line 12 and a synchronizing clock signal along data line 14. The receiver typically includes a D flip-flop for use in sampling the data signal using the synchronizing clock signal to output a binary data signal along output path 16. The clock signal may also be output from the receiver to facilitate further processing of the data. An exemplary data signal (TxData) is shown in FIG. 2 as transmitted data signal 18. The data signal includes blocks or packets of signal pulses defined within bit cells. Data transmitted along path 12 may be encoded subject to conventional data encoding schemes.

Pulse train 20 in FIG. 2 illustrates a synchronization or clock signal(TxClock) transmitted along clock line 14. As can be seen from FIG. 2, the transmitted data signal and the transmitted clock signal are initially synchronized, i.e., rising edges of pulses in clock signal 20 are synchronized with the middle of bit cells in the data packet of transmitted data 18. Pulse sequence 22 (RxData) represents the data signal as it is received by receiver 10, at some arbitrary time later which depends upon the data transmission rate of the serial bus line. Pulse sequence 24 (RxClock) represents the clock signal as it is received by receiver 10. As can be seen from FIG. 2, rising edges of the clock signal are no longer synchronized with the middle of the bit cells. Rather, the rising edges of pulses in clock signal 24 are received well in advance of the middle of bit cells of data packet 22. As a result, with receiver 10 sampling data signal 22 at each rising edge of clock signal 24, receiver 10 may output erroneous data along line 16 because of the shift or skew between the received data and clock signals.

Skew, such as that illustrated in FIG. 2, may arise for a variety of reasons including, for example, a difference in length of data line 12 and clock line 14. Skew may additionally arise due to a mismatch between transmitters used for transmitting the signals onto the data or clock lines or a mismatch between receivers used for receiving the data or clock signals. Skew may also arise due to differences in temperature or voltage of components employed in transmitting or receiving signals over the data bus.

Skew which does not vary significantly as a function of time is commonly referred to as systematic skew. For example, if there is a mismatch in length between the cables of a twisted pair transmission line, that difference in length will produce a constant amount of skew.

Considering skew in more detail, for optimum receiving, the clock edge used by a receiver for sampling data should be aligned with the center of the data bit cell to maximize both the set-up time (the amount of time between a change in the data signal and a change in the clock edge) and the hold time (the amount of time the data is maintained at its previous value following an active clock edge). Setup and hold times are illustrated in FIG. 3 with an exemplary data signal 19 and an exemplary clock signal 21.

The set-up and hold time of the receiving flip-flop of receiver 10 represent only a part of the total set-up and hold times of the receiver. The set-up and hold time of FIG. 3 represents the error margin of the data transmission system and is sufficient to account for most types of random errors (e.g. time jitter, amplitude uncertainty that translates into time jitter, inter-symbol interference that translates into time jitter, duty cycle distortions that translate into time jitter, channel skew, etc.) that may occur in the communication system. Such errors have, in general, equal probability in both time directions.

In the case of FIG. 2, assuming that enough hold time margins exists, a receive error will occur in the case of a burst mode data+clock (synchronous) communication. In such a case the received sequence is 00100011011 instead of 01000110110.

A related skew error occurs if the set-up or hold time becomes too small, as shown in FIG. 4. In this situation the received data may be incorrect, even for a synchronous continuous transmission, because of meta-stability problems resulting from sampling the data signal at the rising and falling edges of the data signal.

A number of techniques has been developed for detecting or minimizing skew between a data signal and a clock signal. In particular, phase-locked-loop (PLL) techniques have been developed for re-synchronizing a clock signal to a data signal. However, PLL-based techniques typically require a substantial lock-in time before the PLL-based system determines the amount of skew and offsets the clock signal to compensate for the skew. Accordingly, such techniques may be ineffective for use in high speed data transmissions employing short bursts of data. In such circumstances, the PLL-based system may not determine the amount of skew until after losing a significant number of bits in an input data packet.

A skew-related problem also occurs at the transmitter. Data transmission systems typically transmit the data and clock signals aligned in quadrature, i.e., the clock edge is in the center of the bit cell. To achieve precise alignment, the transmitter must contain circuits operating with a clock signal having a period equal to one half of the bit cell. For a high speed bus this is a significant technical challenge. As an example, a transmitter operating at 100 Mbps must include circuits operating as fast as 200 MHz.

Another type of distortion, related to skew is clock duty cycle distortion. Clock duty cycle distortion is a type of distortion that occurs on communication lines in which, due to channel imperfections, the "high" clock period becomes shorter (or longer) than the "low" clock period. Such a distortion creates a clock signal with a duty cycle different from 50% so that it is necessary to independently determine the optimum position of the cock rising edge and of the clock falling edge.

Heretofore, no simple, yet effective, techniques have been developed for minimizing skew within high data rate "burst" communication lines. Moreover, no effective techniques have been developed for receiving "burst" communications which relax transmission alignment constraints and allow for compensation of duty cycle distortion.

SUMMARY OF THE INVENTION

From the foregoing, it can be appreciated that there is a need to provide an improved technique for detecting and reducing skew between a pair of signals received along parallel transmission paths. It is an object of the invention to provide such an improved de-skewing technique. In particular, it is an object of the invention to provide a simple and reliable de-skewing technique for substantially eliminating skew between a pair of signals received over parallel paths of a high speed data bus transmitting short bursts of high data rate transmissions.

These and other objects of the invention are achieved by a de-skewer apparatus for minimizing skew between a clock signal and a data signal received along a pair of communication lines, with the de-skewer apparatus having: a delay line for generating delayed versions of the clock signal and a detector means for comparing the delayed clock signals with the data signal to identify a clock signal having a minimum amount of skew.

In a preferred embodiment of the invention, the apparatus includes:

(a) a means for receiving a clock signal along a first communication line and a means for receiving a data signal along a second communication line, wherein the data signal includes a preamble having an initial pair of bit cells providing rising and falling signal level transition edges separated by a single clock cycle;

(b) a delay line having a plurality of sequentially connected delay elements connected to the first communication line for delaying the clock signal by increasing amounts as the clock signal is transmitted through the delay line;

(c) a plurality of flip-flop circuits, operably connected to the delay elements, with each individual flip-flop circuit having a first input connected to an output of a single respective delay element and having a second input receiving the data signal from the second communication line;

(d) a detector circuit for receiving outputs from the flip-flops and for determining which of the flip-flops corresponds to a delayed version of the clock signal having a least amount of skew; and (e) a multiplexer connected to the detector circuit and connected to the delay line elements for receiving and transmitting the delayed clock signal having the least amount of skew from the delay element selected by the detector circuit.

Also, in accordance with a first preferred embodiment, a second bank of flip-flops is connected between the first bank of flip-flops and the detector circuit, for eliminating metastability problems which may arise with a single bank of flip-flop circuits. The delay elements are preferably simple transistor devices providing a signal delay of a fraction of the pulse width of the clock signal. With a clock signal having a period of ten nanoseconds, six flip-flops are provided, each providing a delay of several nanoseconds.

The preamble in each data packet provides a discrete synchronization pulse for comparison with the delayed clock signals. By providing a preamble synchronization pulse within each data packet, the de-skewer of the invention may be employed to eliminate skew on an individual data packet basis. Hence, skew which varies as a function of time may be substantially eliminated, so long as the skew does not vary substantially over the period of a single data packet. If skew is not a function of time, once an appropriate clock signal delay is determined from a first preamble, the de-skewer need not determine the amount of skew again.

Thus, the first preferred embodiment of the invention provides a simple and reliable technique for substantially eliminating skew between a pair of signals received along parallel transmission paths. The invention exploits a simple set of delay elements in a delay line for producing delayed versions of a clock signal. A bank of flip-flops compares the delayed clock signals to an initial synchronization pulse within a preamble of the data signal. A detector monitors the flip-flops to select a single one of the flip-flops which corresponds to a substantially de-skewed clock signal. The multiplexer transmits only the selected delayed clock signal. Thus, a minimal number of simple components are employed to substantially eliminate skew problems. Moreover, the invention provides a purely open loop system for detecting and eliminating skew. Hence, the technique of the invention is not hindered by time delay problems inherent in prior art PLL-based de-skewing architectures. Accordingly, the de-skewer of the invention is ideal for use in de-skewing signals having short bursts of high data rate transmissions, particularly signals subject only to systematic skew or skew which varies slowly as a function of time when compared with the width of data transmissions. The invention may be implemented inexpensively in silicon using conventional CMOS techniques.

Moreover, the invention enables the transmitter to generate unaligned data and clock signals because the alignment function is performed by the receiver, thereby reducing the maximum clock frequency of the transmitter circuit in half. As a result, a 100 Mbps transmitter needs to include circuits operating only as fast as 100 MHz.

In accordance with an alternative preferred embodiment of the invention, a double-edged de-skewed apparatus is provided for reducing skew and for reducing duty cycle errors in signals received along a pair of communication lines. The double-edged de-skewer comprises:

a) a delay line means for generating delayed versions of a clock signal received along a first communication line;

b) a first detector means for comparing the delayed clock signals with rising edges of a data signal received along a second communication line to identify a first delayed clock signal having a least amount of skew relative to the rising edges;

c) a second detector means for comparing the delayed clock signals with falling edges of the data signal to identify a second delay clock signal having a least amount of skew relative to the falling edges;

d) first output means for outputting the first delayed clock signal having the least amount of skew; and e) a second output means for outputting the second delayed signal having the least amount of skew.

Thus the double-edged de-skewer generates a pair of clock signals, one being synchronized with rising edges in the data signal and the other being synchronized with falling edges in the data signal. If the two clock signals differ, it is a result of duty cycle errors in the data signal. Duty cycle distortion results in an expansion or contraction in the bit cells between a rising edge and an immediately subsequent falling edge. The duty cycle distortion does not affect the time between consecutive rising edges or between consecutive falling edges. Thus, by providing a pair of clock signals separately synchronized to the rising and falling edges, the presence of duty cycle distortion is detected and the amount of duty cycle distortion may be calculated. Ultimately, the duty cycle distortion may be eliminated or compensated for by using the pair of clock signals.

Preferably, the double-edged de-skewer is configured similarly to the single-edged de-skewer summarized above, and includes banks of flip-flops operably connected to the delay line for comparing outputs of the delay line with a preamble pulse provided within the data signal. A decoder processes outputs of the flip-flops to identify a delay element providing a delay signal having a least amount of skew. However, with the double-edged de-skewer, the data signal is provided with a pair of preamble pulses. Initially, the flip-flops and decoder process delayed clock signals relative to a rising edge contained within the first preamble to identify a delay element providing a delayed clock signal having a least amount of skew relative to the rising edge. Next, the flip-flops and decoder compare delay clock signals with a falling edge in the second clock preamble to identify a delay element providing a least amount of skew relative to the falling edge of the second preamble. By utilizing a single delay line and a single set of flip-flops to generate both output clock signals, the amount of circuitry required is minimized.

The implementation of the present invention for a dual clock edge system relaxes the duty cycle specifications for the transmitter. This change, in certain circumstances, can again cut in half the maximum clock frequency required by the transmitter circuits, such that a 100 Mbps transmitter must include circuits operating only as fast as 50 MHz.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

A de-skewing method and apparatus for use with data bus transmission lines having parallel paths is disclosed. In the following description for purpose of explanation, numerous details are set forth to provide a thorough understanding of the present invention. However, it will be apparent to one skilled in the art that these details are not required in order to practice the present invention. In other instances, well known structures and circuits are shown in block diagram form in order not to obscure fundamental aspects of the invention.

Figure 1:
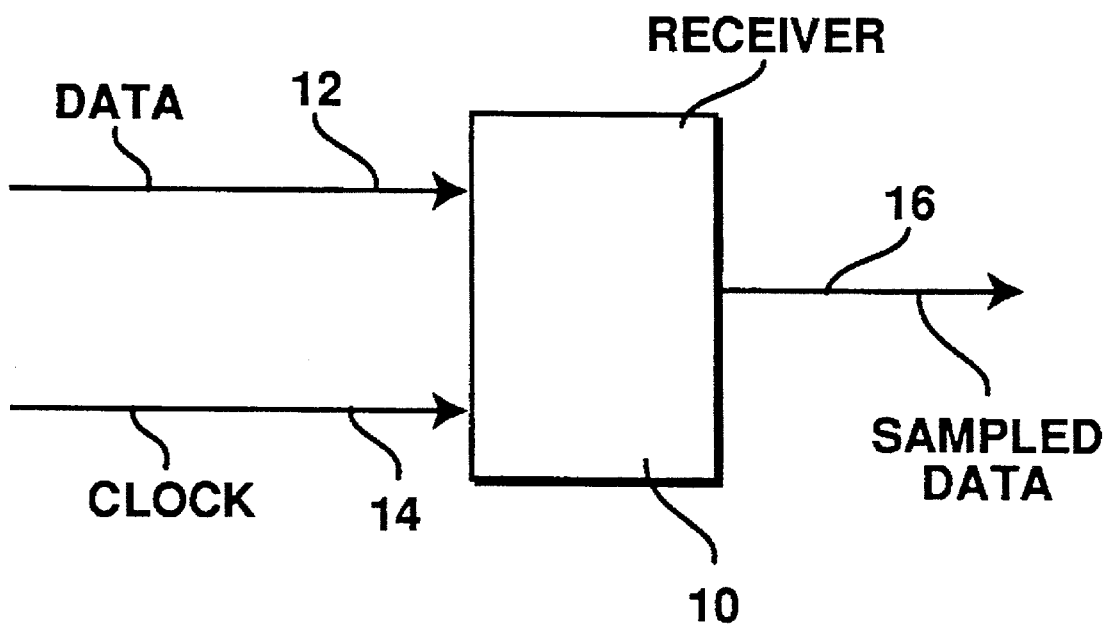
FIG. 1 is a block diagram illustrating a receiver for sampling data received over a serial data bus line using a clock signal received over a parallel path of the transmission line.
Figure 2:
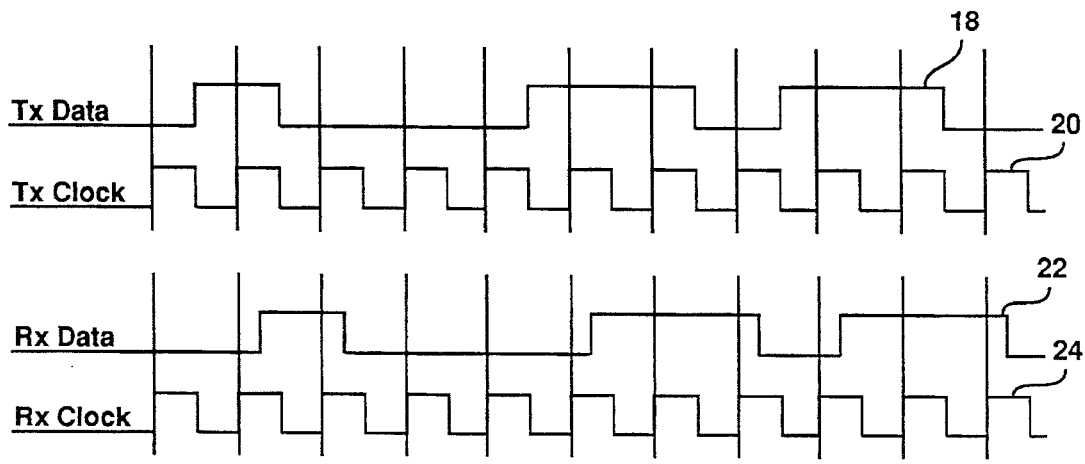
FIG. 2 is a graphical representation of data and clock transmission pulse sequences illustrating skew.
Figure 3:
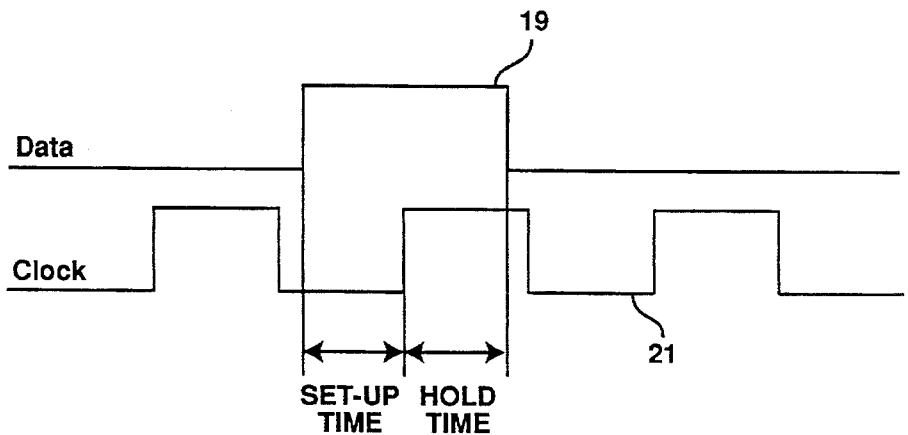
FIG. 3 illustrates setup and hold times for a data receiver.
Figure 4:
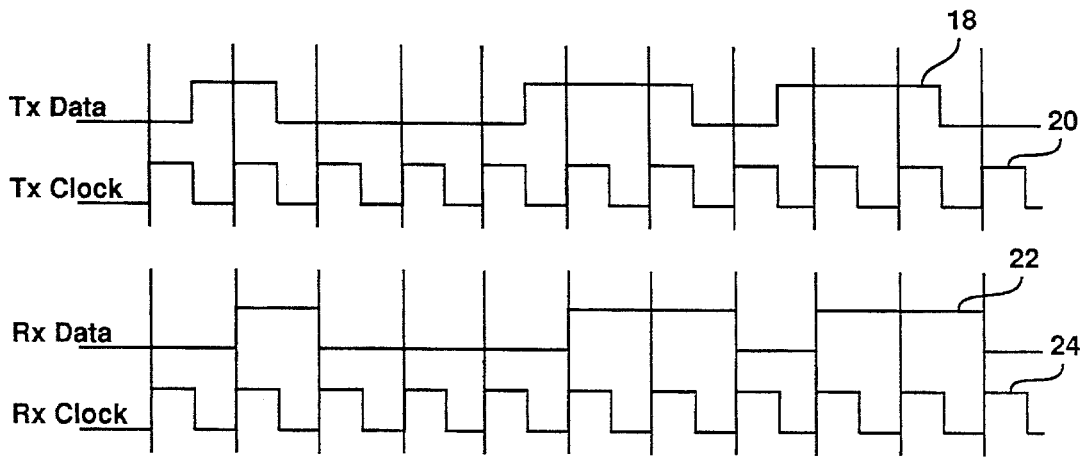
FIG. 4 is a graphical representation of data and clock transmission sequences illustrating skew leading to metastability problems.
Figure 5:
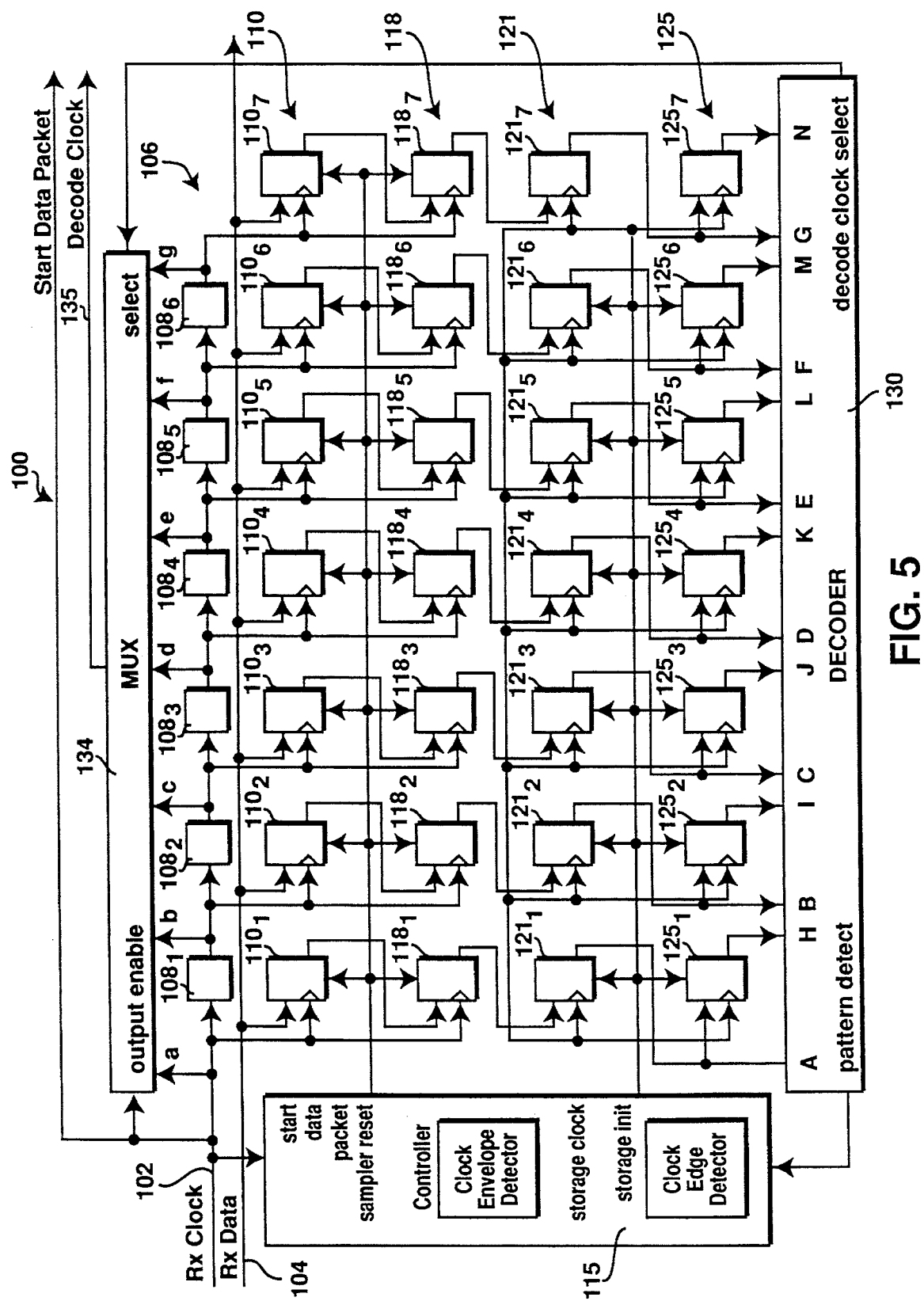
FIG. 5 is a logic schematic of a de-skewer apparatus constructed in accordance with a preferred embodiment of the invention.
Figure 6:
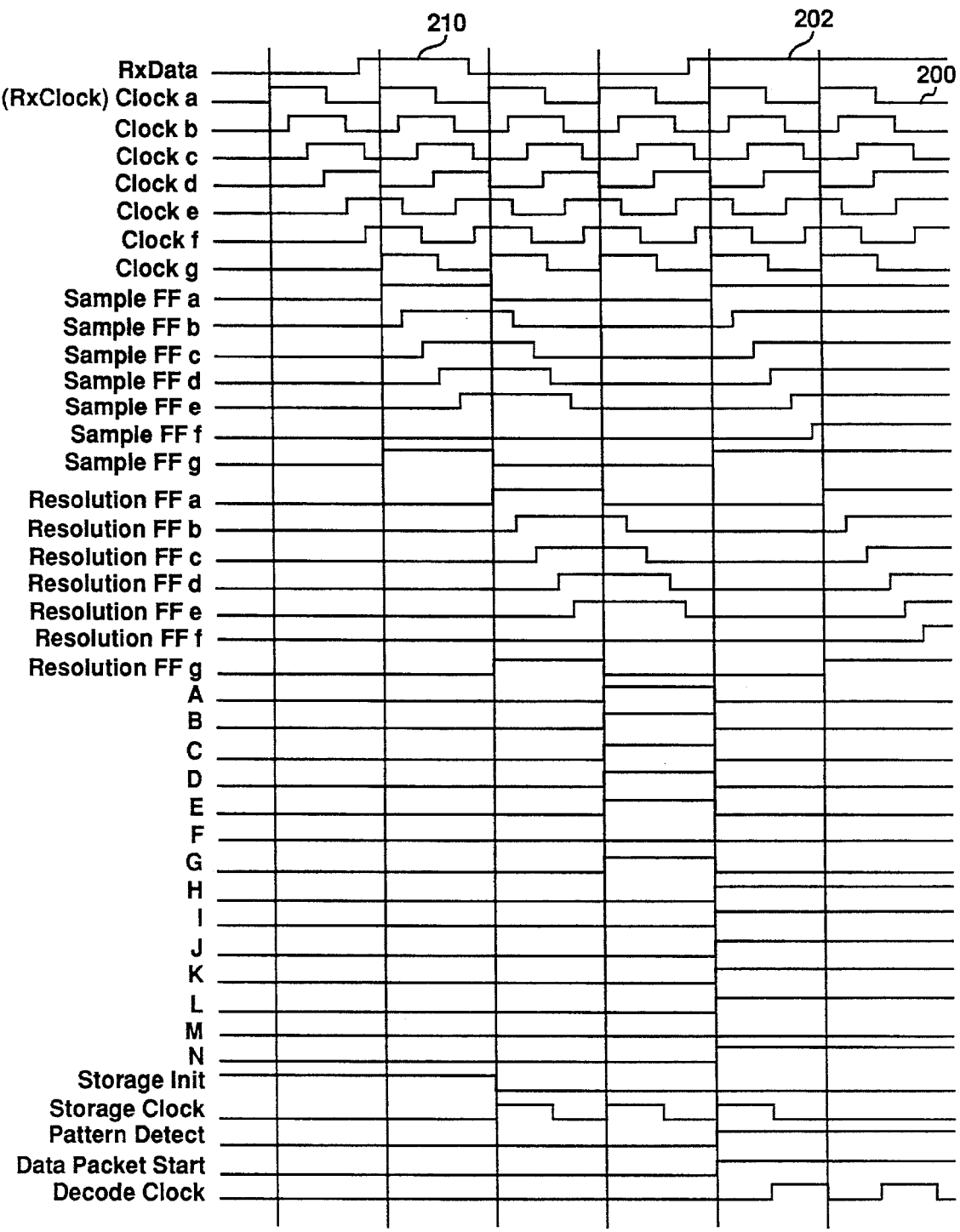
FIG. 6 is a graphical representation of exemplary data and clock signal pulse trains generated by the de-skewer apparatus of FIG. 5.

Referring to FIGS. 5–8, a preferred embodiment of a single-edge de-skew of the invention will now be described. FIG. 5 provides a logic diagram schematic of a de-skewer apparatus 100 having an input clock transmission line 102 (RxClock) and an input data transmission line 104 (RxData). A clock signal received along clock line 102 is illustrated in FIG. 6 as pulse train 200. A data signal received along data line 104 is illustrated in FIG. 5 as pulse train 202. As can be seen from FIG. 6, clock signal 200 is not synchronized with data signal 202. Rather, a rising edge of an initial pulse in clock signal 200 is offset from the middle in an initial pulse in data signal 202. Therefore, if clock signal 200 were employed to sample data signal 202, the offset between the signals could result in erroneous translation of data signal 202. In FIG. 6, clock signal RxClock is also identified as clock "a".

Referring specifically to FIG. 5, the clock signal received along line 102 is transmitted through a delay line 106 having a total of six individual delay elements 108, denoted with subscripts. Each delay element delays the clock signal by a certain predetermined amount. Preferably, the delay elements are identical and thereby provide substantially equal amounts of delay. However, it is not necessary for the purposes of the invention that the delay elements provide equal amounts of delay.

In addition to delay line 106 the de-skewer of FIG. 5 includes four banks for flip-flops 110, 118, 121 and 125, a decoder 130, a controller 115, and a multiplexer 134. As will be described in more detail below, the banks of flip-flops receive delayed clock signals and RxData and output values indicating whether the rising edges of the clock signals occur within bit cells of the data signal. Output values of the flip-flops are processed by decoder 130 to determine which delay element of delay line 106 provides a delayed clock signal having a least amount of skew. Decoder 130 transmits a DECODE CLOCK SELECT signal to multiplexer 134 which identifies the delay element found to provide the clock signal having the least amount of skew. Multiplexer 134 transmits only the selected clock signal as the DECODE CLOCK signal along output line 135. Controller 115 controls the operation of the banks of flip-flops and the multiplexer. In particular, controller 115 receives the input clock signal (RxClock) and a PATTERN DETECT signal from decoder 130 and outputs various control signals to the flip-flops on the multiplexer.

An output of a first delay element 108₁ is illustrated in FIG. 6 as pulse clock "b". As a result of the delay provided by delay element 108₁, output clock signal "b" is delayed from clock signal 200 by several nanoseconds. Delay element 108₂ provides an additional delay of several nanoseconds, as do remaining delay elements 108₃ to 108₆. The corresponding delayed clock signals are illustrated in FIG. 6 as clock signals "c"–"g". The sequential configuration of delay elements 108 ensures that each successive output of each successive delay element is delayed by an additional amount.

Outputs from delay line 106 are transmitted in parallel to a first bank of flip-flops 110, called sampling flip-flops. In particular, clock "a" (RxClock) is transmitted to an input port of a first flip-flop 110₁. Clock "b" is transmitted to an input port of a second flip flip 110₂. Flip-flops 110₃–110₇ receive clock signals output from corresponding delay elements 108₂–108₆ in delay line 106. Parallel transmission lines are employed for transmitting delayed clock signals from delay line 106 to the first bank of flip-flops 110.

Each flip-flop in bank 110 additionally includes a second input for receiving data signal 202 (RxData). Each flip-flop in bank 110 includes a single output line which is connected into an input port of a flip-flop in a second bank of flip-flops 118o The second bank of flip-flops are metastability resolution flip-flops. In FIG. 5, subscripted indices are provided for representing each individual flip-flop. Each flip-flop 118 includes a second input port which receives a delayed clock signal directly from delay line 106. Thus, each delayed clock signal output from a delay element 108 is input to both a flip-flop in sampling bank 110 and a second flip-flop in metastability resolution bank 118.

A third bank of flip-flops 121 is provided. Each flip-flop within bank 121 receives, as input, the output of a corresponding flip-flop in bank 118. The flip-flops in bank 121 also receive, as input, a storage clock signal transmitted from controller 115. A fourth bank of flip-flops 125 is also provided, with each flip-flop within bank 125 receiving the output from a corresponding flip-flop in bank 121 and also receiving the storage clock signal from controller 115. The third and fourth banks of flip-flops 121 and 125, respectively, are storage elements employed to store sample data received from the first and second banks of the flip-flops, 110 and 118, respectively.

An output port of each flip-flop in bank 125 is connected to a decoder circuit 130. Hence, decoder circuit 130 receives 1's or 0's depending upon the state of the flip-flops in banks 110, 118, 121, and 125. Outputs of the flip-flops of bank 125 are designated in the FIG. 5 as H, I, J, K, L, M, and N. Decoder 130 also receives signals directly from the third bank of flip-flops 121, respectively denoted A, B, C, D, E, F, and G, in FIG. 5. Thus, decoder 130 receives a total of 14 inputs. As will be described in more detail below, decoder 130 determines which of clock signals clock "a"–clock "g" provides a clock signal having the least amount of skew.

In addition to the inputs described thus far, the first and second bank of flip-flops 110 and 118, respectively, also receive a SAMPLE RESET signal directly from controller 115. The third and fourth banks of flip-flops 121 and 125, respectively, receive a STORAGE INITIALIZATION signal directly from controller 115.

Considering the effect of flip-flops in bank 110, each flip-flop compares a delayed clock signal with the data signal. For each rising edge in the delayed clock signal, the flip-flop determines whether the data signal is in a high signal state or a low signal state. If high, the flip-flop outputs a 1; if low, the flip-flop outputs a 0. Hence, each flip-flop compares the signal values of the delayed clock signal and the data signal to determine whether a rising edge of a pulse in a clock signal occurs between the rising and falling edges of initial pulse 210 (FIG. 6) in data signal 202.

The second bank of flip-flops 118 is provided to minimize metastability problems which may occur in the first bank of flip-flops in the event the rising edges of the clock signals are synchronized with rising edges in the data signal. However, the flip-flops of the second bank of flip-flops do not affect the logic state of the signals output to bank s 121 and 125.

The signals output from the various components of the de-skewer of FIG. 5 are illustrated in FIG. 6. As can be seen from FIG. 6, clock signals "a"–"g" are increasingly delayed with respect to input data signal 202 as a result of delay line 106. The outputs of the first bank of flip-flops 110 are identified in FIG. 6 as sample flip-flop (FF) outputs "a"–"g". The outputs of the second bank of flip flips 118 are identified in FIG. 6 as resolution (FF) signals "a"–"g". Input signals received by decoder 130 are identified by corresponding letters A–N. Finally, FIG. 6 also illustrates STORAGE INITIALIZATION signal, STORAGE CLOCK signal, PATTERN DETECT signal, DATA PACKET START signal and DECODE CLOCK signals generated by the controller and the decoder.

Decoder circuit 130 examines the sequence of logic values A–N received to identify which of delay elements 108 provides an amount of delay corresponding to a least amount of skew. With an input logic bit sequence having an odd number of 1's, detector circuit 130 selects the delay element corresponding to the central-most value of 1. In the example shown in FIG. 6, the input values to decoder 130 are "H, I, J, K, L, M, N, A, B, C, D, E, F, G"="00111111000000" in this example, the first and only pattern of more than three successive "1" values is formed by the inputs "J, K, L, M, N, A". From this input, decoder circuit 130 identifies delayed signal clock "e" as being the clock signal with the least amount of skew.

Figure 7:
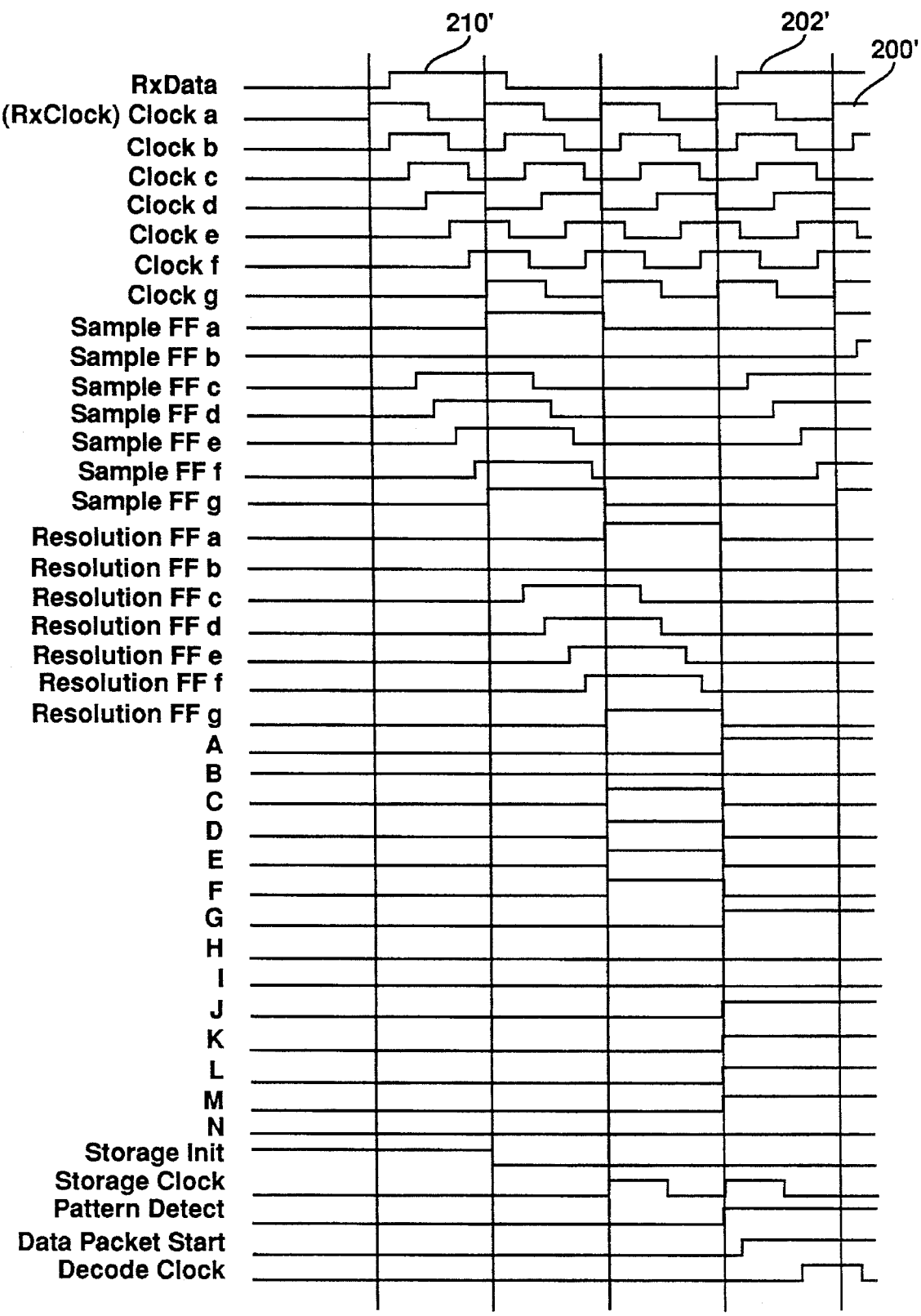
FIG. 7 is a graphical representation of a second example of data and clock signal pulse trains generated by the de-skewer apparatus of FIG. 9.

As a second example, illustrated in FIG. 7, the input lines values are "HIJKLMNABCDEFG"="11111010000000". In this case the first (and only) pattern of more than 3 successive "1" values is formed by the inputs "HIJKLM". Thus the "DECODE CLOCK SELECT" output selects the clock corresponding to the J input which is clock "c".

By predefining the amount of delay generated by each delay element, the de-skewer can be configured to provide a fewer number, or a greater number, of logic values of 1. Thus, with a shorter delay provided by each delay element, the delay between clock signals is compressed, such that six, seven or more flip-flops may output logic values of 1. If an even number of logic values, such as four, are returned, decoder circuit 130 arbitrarily selects the clock signal corresponding to either of the two centeral-most positive logic values.

Generally, decoder 130 is implemented using standard combinatorial circuits which perform the following functions:

The "Pattern Detect" output is active if and only if at least one of the inputs H, I, J, K, L, M or N is "1".

The input lines are scanned in the order "HIJKLMNABCDEFG" for the first group of three or more successive "1" values. A "DECODE CLOCK SELECT" output is generated such as to select the clock corresponding to the center of the found pattern.

The actual circuitry within decoder 130 for inputting the logic values output from the flip-flops and for determining which logic value corresponds to a clock signal having the least amount of skew, is designed and fabricated using conventional techniques and will not be described in detailed herein. However, decoder circuit 130 is preferably a simple integrated circuit formed on a silicon chip also providing the flip-flops and delay elements.

Decoder circuit 130 outputs DECODE CLOCK SELECT control signal along line 132 to a multiplexer (MUX) 134. The signal transmitted along line 132 identifies the sequential number of the delay element providing the delayed signal having the least amount of skew. For the example illustrated in FIG. 6, detector circuit 130 outputs a signal representative of clock signal "e". MUX 134 is connected to the outputs of each delay element 108 via parallel paths. In response to the DECODE CLOCK SELECT signal received from detector circuit 130 along line 132 and the output enable signal from controller 115, MUX 134 outputs only the selected delayed clock signal. Thus, MUX 134 operates as a gate to allow transmission of only one of the delayed clock signals to a receiver (not shown). In the example of FIG. 6, MUX 134 transmits only clock signal e and prevents or rejects transmission of all other delayed clock signals.

The design and fabrication of MUX 134, and the various delay elements and flip-flops is straight forward and will not be described in further detail herein.

To facilitate a proper determination of the skew between the input clock signal and data signal, the data signal is provided with a preamble pulse. In an exemplary embodiment, the preamble has a length of 4 bit cells and has a value of "0100". The duration of the preamble scales with the change in transmission speed such that the preamble overhead does not increase with an increase in transmission speed.

This particular preamble is effective as long as the maximum expected skew between clock and data is not greater than ±½ bit cell (with respect to the ideal position in which the clock edge is in the center of the bit cell).

Generally, the preamble used by the de-skewer of FIG. 5 begins with "k" successive "0" data bits followed by the sequence "0100". The number "k" is equal with the number of bit cells (or fraction of) by which the maximum expected skew is greater than ½ bit cell. If data signal includes a preamble pulse other than described above then additional delay elements may be required and the logic of detector circuit 130 may require modification, consistent with the principles of the invention.

Figure 8:
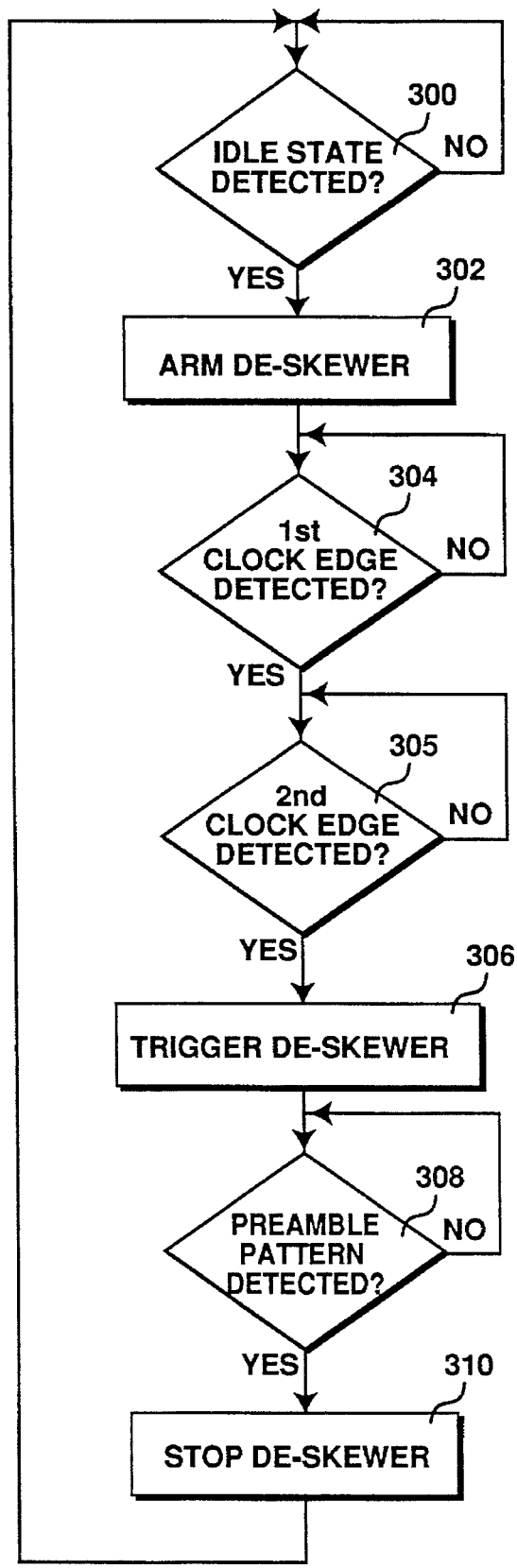
FIG. 8 is a flow chart illustrating the operation of a controller of the de-skewer apparatus of FIG. 5.

Referring to FIG. 8, the operation of controller 115 will now be described. Initially at step 300, the controller waits for the end of a received data packet. When the data packet is completed the corresponding clock signal stops. Termination of the clock signal is detected by a clock envelope detector within controller 115.

At 302, controller 115 arms the de-skewer by initializing the flip-flops in banks 121 and 125 via a storage initialization (init) signal. As noted above, these flip-flops provide storage elements. The initialization signal remains active until a trigger stage is reached, described below. Also at step 302, the DATA PACKET START SIGNAL signal output to MUX 134 is reset and the sampling and resolution flip-flops in banks 110 and 118 are reset via a SAMPLER RESET signal. At step 304, the first clock edge of the preamble a new data packet is detected by a clock edge detector within controller 115. At step 305, the second clock edge of the preamble is detected.

Once a clock edge of a new signal is detected, the de-skewer is triggered at step 306. At this point, the INITIALIZATION SIGNAL is generated and the clock edges that follow are directed to the storage elements as the STORAGE CLOCK signal. At 308, controller 115 analyzes the data packet to detect the expected preamble pattern. If detected, execution proceeds to step 310 to halt operation of the de-skewer. The de-skewer is halted only after a delay line element is identified by decoder 120 and a PATTERN DETECT signal is transmitted to controller 115. De-skewer operation is halted by terminating the storage clock sent to the storage elements. At this step the data packet start signal is also activated, as soon as the RxClock signal "0". Execution of the controller than returns to step 300 to await an idle state occurring after the end of the current data packet.

Referring again to FIG. 5, the number of delay elements and the amount of delay provided by each individual delay element may be optimized for particular types of data or for particular data transmission rates which are expected to be received. Moreover, the number of delay elements and the delay provided by each element may be selected to provide for additional clock resolution if desired. Thus, a larger number of delay elements and flip-flops may be provided to allow decoder circuit 130 to be more precisely determine the amount of skew between the clock and data signals.

The following equations express a relationship between the number of delay elements, the amount of delay generated by each delay element, bit cell width of the received signals, and the set-up and hold times, which are sufficient to ensure the proper operation of the described implementation. Thus, by selecting parameters consistent with these equations, the de-skewer is assured of unambiguously determining the delayed signal having the least amount of skew.

$$T_{d\ max} \leq (T_{clock} + T_{s\ max} + T_{h\ max})/3 \quad (1)$$

$$T_{d\ min} \geq T_{clock}/(n+1) \quad (2)$$

where:

$T_{d\ max}$ = a worst case maximum delay of any delay element.

$T_{d\ min}$ = a worst case minimum delay of any delay element.

n = the number of delay elements that form the delay line.

$T_{s\ max}$ = a worst case maximum set-up time of the sampling flip-flops.

$T_{h\ max}$ = a worst case maximum hold time of the sampling flip-flops.

$T_{clock}$ = the clock period (or bit cell period).

Selection of correct parameters of the sampling flip-flops is important for proper operation of the de-skewer. If these parameters are very small in relation with $T_{d\ min}$ then the variation of the flip-flops with time, temperature and power supply voltage can be ignored. On the other hand if these parameters are of approximately the same order of magnitude as $T_d$ min then their variation must be small within the time frame of a data packet transmission.

Another configurable aspect of the system is the use of the preamble provided at the beginning of the data signal. The preamble may be provided prior to each block or packet of data or may be provided only upon initialization of the entire data bus system. A preamble is required only upon initialization if the skew is almost entirely independent of time. If the amount of skew varies as a function of time according to temperature or other factors, a preamble may be required for each data block or data packet to enable clock re-synchronization with each data block or packet. Although a single synchronization pulse within the preamble having a pulse width equal to the width of the clock pulses is preferred, other more complicated preamble may be used.

Alternatively, the de-skewer can be configured to determine the amount of skew without requiring a preamble. This may be achieved by providing an extended array of delay elements along with corresponding flip-flops. With such an architecture, the de-skewer merely uses any combination of successive rising and falling edges in a data signal to determine the amount of skew. In such an embodiment, detector circuit 130 is provided with appropriate circuitry for selecting one of the delayed clock signals, based on the outputs of all of the flip-flops connected to all of the delay elements. Thus, the principles of the invention may be exploited in a wide number of configurations to eliminate skew in a variety of serial data bus receivers. If a larger number of delay elements is used than described herein, care should be taken to ensure that the clock signal is accurately transmitted through the delay elements down the entire length of the delay line.

The delay elements that are used in the implementation of the delay line (106) should be stable with time and temperature in a time frame defined by the frequency of the skew correction procedure. The variation of their delay with time and temperature has the same effect as the variation with time and temperature of the skew that is being compensated.

Thus, if the de-skewer is activated (selects the optimal clock) at the beginning of every packet transmission, the delay of the delay elements as well as the systematic skew must remain substantially unchanged for the duration of one data packet transfer. While systematic skew is quite stable over long periods of time, the delay provided by the delay elements may change significantly. For systems in which the length of data packet is large compared with the stability interval of the delay of the delay elements, the de-skewer should be activated more than once per packet.

The de-skewer can be activated less than for every packet or even only once after the system initialization when both the skew an the delay are very stable.

The power supply voltage is also a short item factor, like time and temperature, which influences the stability of the delay of the delay elements.

Considerations similar to those described above regarding the delay elements also apply to the set-up and hold time parameters of the internal flip-flops used. In general, if the flip-flops are fast enough (which is the case for high speed bus) the set-up times and hold time are small in comparison with the minimum delay of the delay elements, such that the variation of the flip-flops is insignificant. On the other hand, the variation of the delay of the delay elements and the variation of the set-up and hold times of the internal flip-flops from device to device as result of a manufacturing inconsistency or aging are largely unimportant, as long as the limit relations of equations (1) and (2) are met. The aging process occurs in a time frame much longer than the time interval between two successive error corrections. Furthermore, the de-skewer of the invention does not require an absolute match between the delay elements. The de-skewer is effective for any degree of matching between the delay elements as long as the relations, provided above, are correct at all times.

Further, the de-skewer can be applied to any number of data lines transmitted together with a clock line. Each data line will have an identical and independent implementation of this circuit. This particular implementation is quite useful for many parallel buses.

Generally, the implementation of the single-edged de-skewer requires a mechanism for signaling the beginning of a correction cycle, a preamble, a string of delay elements, sets of flip-flops, a decoder and a multiplexer. The mechanism for signaling the beginning of a correction cycle is responsible for arming and triggering the de-skewer. After detecting the beginning of a new correction cycle, such a mechanism initializes the de-skewer circuit and trigger the error correction operation. The de-skewer circuit completes its operation and maintains the error correction information until a new initialization.

If the correction cycle is performed only once, following a system initialization, than this mechanism is implemented merely as a system initialization detector. Arming is generated by the system initialization signal while the triggering is performed by the beginning of the first message following the initialization.

If the correction cycle is performed at the beginning of every data transfer, this mechanism may be the same as the start of packet detector. The arming is performed by an "idle" state detector and the triggering by a "begin of packet" detector. The beginning of the data packet is signaled by the first active transition of the clock line (rising edge for example) which occurs following the system idle state. The idle state itself can be detected for example by sensing the absence of clock signal transitions using a clock line envelope detector.

In the specific implementations described herein the controller also generates a "Data Packet Start" signals which simplifies the design of the actual receiver. This signal also enables the multiplexer output thus avoiding potential problems on the decode clock line.

Figure 9:
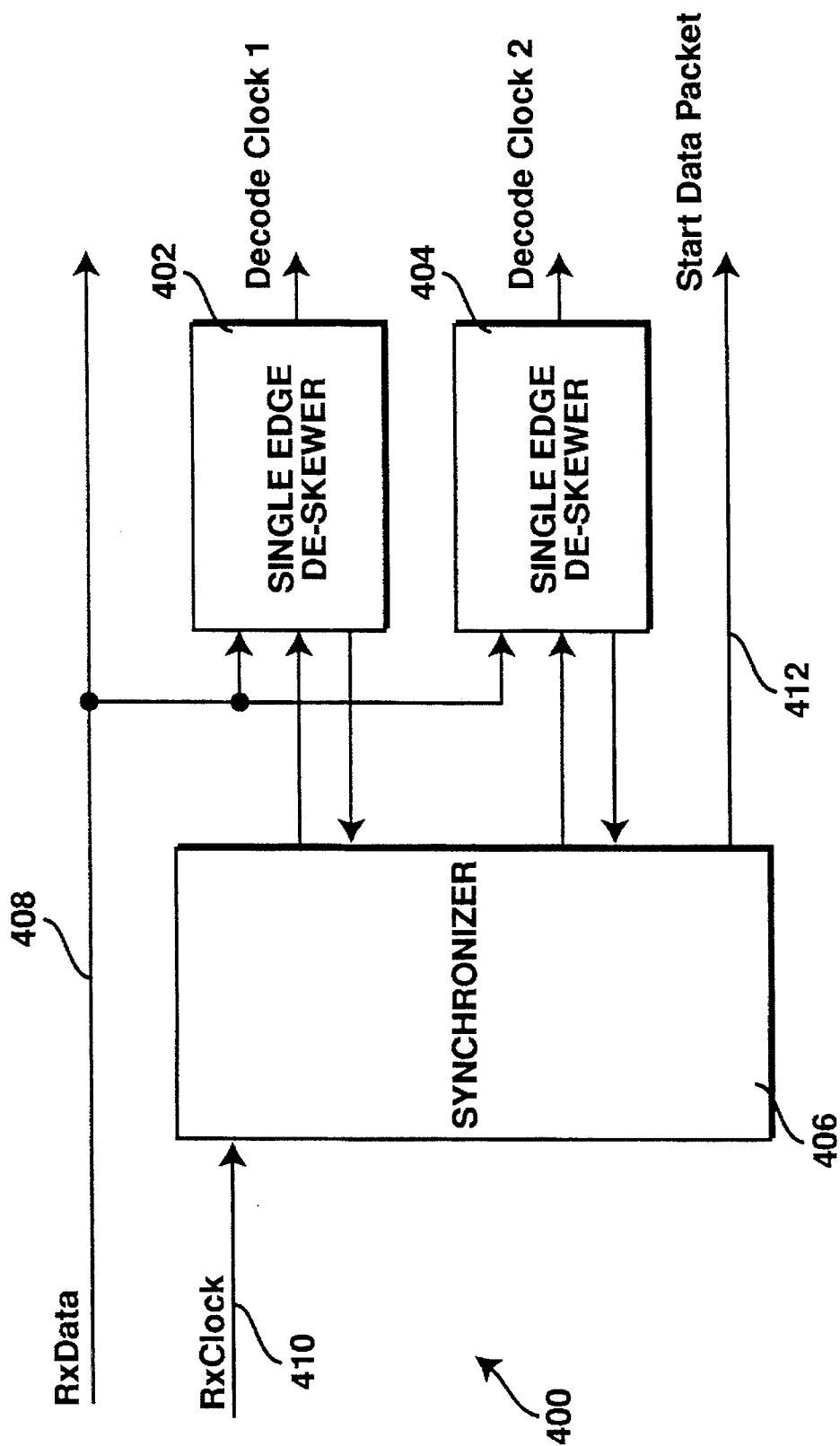
FIG. 9 is a block diagram illustrating a double-edged de-skewer.
Figure 10:
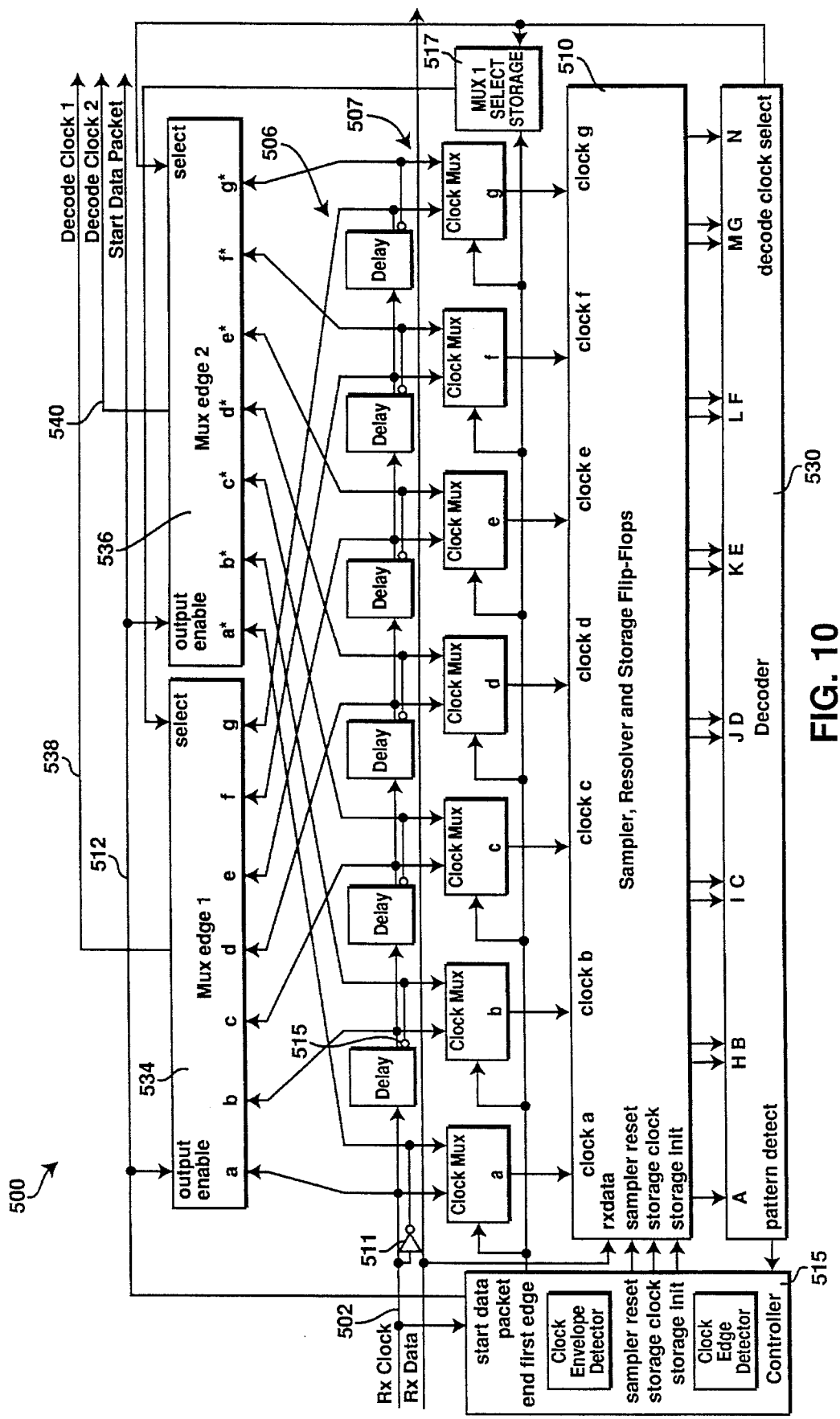
FIG. 10 is a logic schematic of a preferred embodiment of a double-edged de-skewer.
Figure 11:
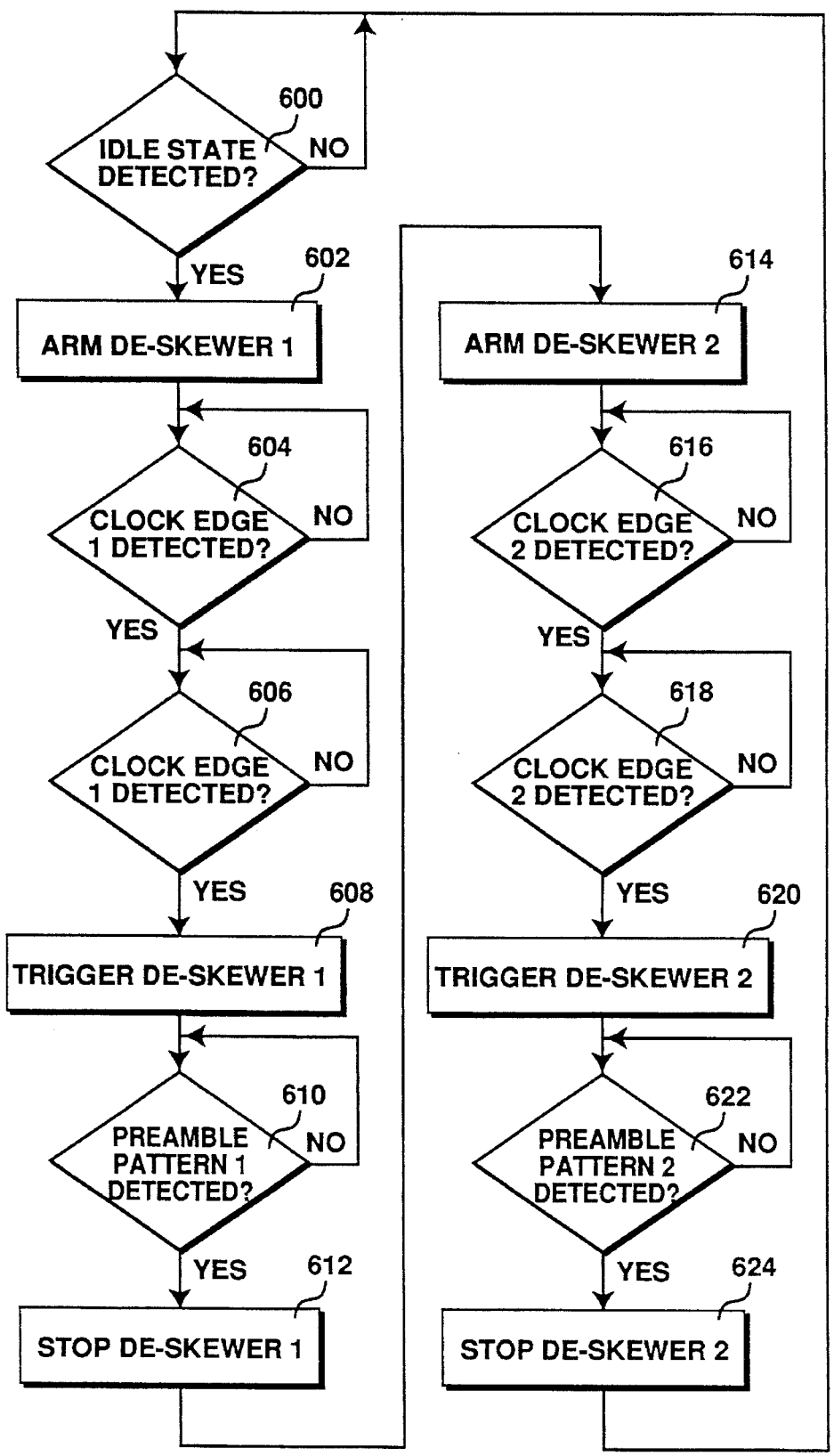
FIG. 11 is a flow chart illustrating the operation of a controller of the double-edged de-skewer apparatus of FIG. 9.

An implementation of a double-edged de-skewer is shown in FIGS. 9–11 described below. A high level block diagram of a double-edged de-skewer is shown in FIG. 9. The double-edged de-skewer 400 includes a pair of single-edged de-skewers 402 and 404 and a synchronizer 406. A data signal (RxData) is received along a data line 408 and a clock signal (RxClock) is received along a clock line 410. Data line 408 is fed directly into single-edged de-skewers 402 and 404, whereas clock signal 410 is received first by synchronizer 406 then transmitted to the single-edged de-skewers. As will be described in more detail below, each single-edged de-skewer outputs a clock signal, respectively denoted DECODE CLOCK 1 and DECODE CLOCK 2. DECODE CLOCK 1 is a clock signal synchronized with rising edges of RxData whereas DECODE CLOCK 2 is synchronized with falling edges of RxData.

However, synchronizer 406 inverts RxClock signal prior to transmission to single-edged de-skewer 404. By inverting clock signal, de-skewer 404 outputs a synchronized clock signal (DECODE CLOCK 2) which is synchronized with falling edges in the data signal rather than rising edges.

Synchronizer 406 coordinates the operation of the single-edged de-skewers and outputs a START DATA PACKET signal along an output line 412. START DATA PACKET signal is a synchronization pulse indicating a presence of a data packet. A receiving apparatus (not shown) receives the RxData signal, the START DATA PACKET signal, and the pair of DECODE CLOCK signals, and operates to sample data using the pair of DECODE CLOCK signals upon receipt of a START DATA PACKET signal. By providing clock signals synchronized to both the rising and falling edges of the data signal, the receiver compensates for duty cycle distortion occurring in the data signal.

Although the double-edged de-skewer may be implemented with a separate pair of single-edged de-skewers as shown in FIG. 9, in a preferred embodiment components of the pair of the de-skewers are combined in a compact double-edged de-skewer illustrated in FIGS. 10–11.

Referring first to FIG. 10, a double-edged de-skewer 500 is illustrated which includes a delay line 506 receiving a clock signal (RxClock) along a clock line 502. Also included are a set of clock multiplexer 507 with one individual clock multiplexer corresponding to each delay element in delay line 506. A bank of sampler, metastability resolver and storage flip-flops 510 are connected to outputs of clock multiplexers 507. The banks of flip-flops 510 may be identical to those illustrated above in FIG. 5. Outputs of the flip-flops 510 are connected to a decoder 530. A controller 515 receives RxClock along line 502 and controls operation of clock multiplexers 507 and flip-flops 510. Additionally included are a pair of output multiplexers 534 and 536 connected to outputs of the delay elements and connected to decoder 530.

Thus, the configuration of the double-edged de-skewer of FIG. 10 is similar to the single-edged de-skewer illustrated above in FIGS. 5–8 but includes two output multiplexers rather than one and includes a set of individual clock multiplexers, not found in the single-edged embodiment. Additionally, an invertor 511 is provided along clock line 502 and each element of the delay line 506 includes an inverted output 513. Thus delay line 506 generates two sets of delayed clock signals, an inverted set and a non-inverted set. Each clock multiplexer 507 receives both an inverted clock signal and an non-inverted clock signal. A first clock multiplexer "a" receives the inverted and non-inverted clock signal without any delay. Clock multiplexer "b" receives the inverted non-inverted clock signal output from a first delay element.

Controller 515 controls operation of the clock multiplexers to either transmit the non-inverted clock signals or the inverted clock signals. During the first stage of the operation of the double-edged de-skewer the clock multiplexers are set to transmit the non-inverted clock signals to flip-flops 510. These flip-flops operate in the same manner with those described above with reference to FIGS. 5–8 and generate outputs "a"–"n" to decoder 530. Decoder 530 operates in the same manner as described above with reference to the single-edged de-skewer, to identify a delay element providing a delayed non-inverted clock signal having a least amount of skew relative to rising edges within the data signal (RxData). An identification of the delay element is transmitted as DECODE CLOCK SELECT through a MUX select storage element 517 to output multiplexer 534 which transmits only the delay clock signal from the identified delay element along an output clock line 538 (DECODE CLOCK 1). MUX select storage element 517 stores the identification of the delay element received from decoder 530. Storage of the first decode clock select signal is required because output multiplexer 534 can not begin outputting a clock signal synchronized to the first edge until after the entire preamble has been processed. Accordingly, MUX select storage element 517 stores the identification of the delay element associated with the first clock edge until the entire preamble has passed and useful data is ready for output. At that time an output enable signal is transmitted to output multiplexer 534 initiating output of the signal synchronized using the delay element identified in MUX select storage 517. MUX select storage element 517 also receives an END FIRST EDGE signal from controller 515.

If the third delay element provides a delayed clock signal having a least amount of skew relative to rising edges within the data signal, multiplexer 534 operates to transmit only delayed clock signals "d" along output line 538 after the entire preamble is processed. In addition to transmitting a DECODE CLOCK SELECT signal to output multiplexer 534, decoder 530 also transmits a PATTERN DETECT signal to controller 515. As with the single-edged de-skewer described above, controller 515 controls operation of the flip-flops by transmitting appropriate RESET, CLOCK, and INITIALIZATION signals. Controller 515 also transmits the START DATA PACKET signal along an output line 512. As noted above, START DATA PACKET signal is received by output multiplexer 534 to initiate operation of the multiplexer. Additionally, the START DATA PACKET signal is output to a receiver (not shown) for signaling the receiver that a data packet is available for decoding.

Once output multiplexer 534 is enabled to transmit a clock signal having a least amount of skew relative to rising edges within the data signal, controller 515 switches clock multiplexers 507 to transmit the inverted clock signals for delay line 506. The inverted delay clock signals are received and processed by flip-flops 510 with outputs "a"–"n" transmitted to decoder 530 which identifies a delay element producing a delay clock signal having a least amount of skew relative to falling edges within the data signal. Thus, flip-flops 510 and decoder 530 operate identically to the first stage described above but process an inverted set of clock signals rather than a non-inverted set. By inputting inverted clock signals, the decoder 530 identifies a delay element which minimizes skew relative to the falling edges to the data signal rather than the rising edges. Once an appropriate delay element is identified, a second DECODE CLOCK signal is transmitted to out multiplexer 536. A second PATTERN DETECT signal is transmitted to controller 515 which transmits a second enabling signal to output multiplexer 536. Once enabled, output multiplexer 536 transmits a clock signal corresponding to a delay element identified by decoder 530. Thus, if decoder 530 indicates that the fourth delay element provides an inverted clock signal having a least amount of skew relative to falling edges within the data signal, then multiplexer 536 transmits clock signal "e*" as a DECODE CLOCK 2 along output clock 530. The clock signal identified as having a least amount of skew relative to the falling edges may differ to the one identified with respect to the rising edges if duty cycle distortion is present in the data signal.

The four sets of flip-flops shown in FIG. 5 (the sampling flip-flops, the resolution flip-flops and the storage flip-flops), the delay elements and the decoder are common for the two de-skewers. A single controller governs the operation of both de-skewers. Each de-skewer has its own DECODE CLOCK multiplexer. In addition the circuit generates the set of sampling clocks "clock a" through "clock g" used by the first de-skewer as well as the set of negated sampling clocks "clock a*" through "clock g*" used by the second de-skewer. A set of clock multiplexers select between the two sets of clocks as directed by the controller. Storage circuit 517 (a register) maintains the "Mux select" result produced by the first de-skewer after it has completed its correction cycle. (Otherwise the result would be lost as various circuits are reused to form the second de-skewer.)

The preamble used in this implementation is "00 10 00 00 00 01 00 00". The odd data bits in this sequence are decoded using the receive clock RxClock rising edge and the even data bits are decoded using the RxClock falling edge.

The operation of the Controller is illustrated in FIG. 11. In FIG. 11 clock edge 1 represents the raising edge of RxClock and clock edge 2 represents the falling edge of RxClock.

The first de-skewer is armed at the beginning of the idle state while the second de-skewer is armed upon the detection of the expected pattern by the first de-skewer. Each de-skewer, after it has been armed, it is triggered by its own controller following the second edge of the received clock.

The "START DATA PACKET" signal is generated as a logical AND operation of the "START DATA PACKET" signals of each individual de-skewer. The steps are:

At 600, the controller waits for the end of the data packet. When the data packet is completed the clock signal stops and this event is detected by the clock envelope detector. The de-skewer 1 is armed by setting the clock multiplexers "Clock Mux a" through "Clock Mux g", at 602, such that the sampler receives a the delayed replicas of RxClock. The storage flip-flops are initialized. The initialization signal remained active until the trigger state, step 60P. At the same time the "Data Packet Start" signal is reset. The sampling flip-flops and the resolution flip-flops are also reset.

At 604, the detection of the first rising clock edge signals the beginning of new data packet transfer. This detection is performed by a clock edge detector with the controller. The detection of the second rising clock edge is performed by the clock edge detector at 606. At 608, the INITIALIZATION signal is released and the clock edges that follow are directed to the storage elements as STORAGE CLOCK. The decoder signals that the expected preamble pattern has been detected at 610. At 612, de-skewer 1 operation is stopped by turning off the clock to the storage elements (The Storage Clock). De-skewer 2 is armed at 614 by setting the clock multiplexers "Clock Mux a" through "Clock Mux g" such that the sampler receives the delayed replicas of negated RxClock. The storage flip-flops are initialized. The initialization signal remains active until the trigger state, step 618. At the same time the "DECODE CLOCK SELECT" decoder output is latched by the "Mux 1 select storage". The sampling flip-flops and the resolution flip-flops are reset. At 616, the detection of the first falling clock edge signals is performed by the clock edge detector. At 618, the detection of the second flaging clock edge is performed by the clock edge detector. The initialization signal is released and the inverted RxClock signal is directed to the storage elements as STORAGE CLOCK, at 620. At 622, the decoder signals that the expected preamble pattern has been detected. At 624, the de-skewer 2 operation is stopped by turning off the clock to the storage elements (The Storage Clock). The "Data Packet Start" signal is activated. The output of multiplexer 1 is enabled. The output of multiplexer 2 is enabled as soon as RxClock is "1" and the Controller returns to step 600.

What has been described is a single-edged de-skewer apparatus and a double-edged de-skewer for eliminating skew between a clock signal and a data signal received along parallel transmission paths. The architecture of the de-skewers is entirely open-loop, thereby avoiding problems inherent in closed-loop de-skewers, such as those employing PLLso The de-skewers are implemented in silicon using conventional CMOS techniques and using a limited number of simple components. Accordingly, the de-skewers are inexpensive to fabricate and reliable to use. Moreover, the de-skewer of the invention may be implemented without requiring substantial modification to either the hardware or software of conventional parallel path data transmission systems. The components used to provide the delay within the delay elements may be any suitable circuit component which provides a delay, such as a pair of inventors, or a transistor. The de-skewer is ideally suited for use in de-skewing short bursts of high speed data received over parallel transmission paths, especially wherein the amount of skew does not vary quickly as a function of time.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A double-edge de-skewer apparatus for reducing skew between a clock signal and a data signal having a leading edge and a trailing edge, received along first and second communication lines, said apparatus comprising:

a delay line coupled to receive said clock signal from said first communication line for delaying said clock signal to generate a plurality of delayed clock signals;

a first detector coupled to receive said plurality of delayed clock signals from said delay line and said data signal from said second communication line, for comparing the delayed clock signals with said leading edge of the data signal to identify a first delayed clock signal having a least amount of skew with respect to said data signal leading edge; and a second detector coupled to said delay line and said second communication line for comparing the delayed clock signals with said trailing edge of the data signal to identify a second delayed clock signal having a least amount of skew with respect to said data signal trailing edge;

a first output coupled to said first detector for outputting said first delayed clock signal; and a second output coupled to said second detector for outputting said second delayed clock signal.

2. A double-edged de-skewer apparatus for reducing skew between a clock signal and a data signal, said apparatus comprising:

a first input for receiving a clock signal;

a second input for receiving a data signal, said data signal having a leading signal edge and a trailing signal edge;

a delay line coupled to receive said clock signal from said first input for delaying said clock signal so as to generate a plurality of delayed clock signals; and a detector coupled to said second input and said delay line for comparing said plurality of delayed clock signals with said data signal to identify a first delayed clock signal having a least amount of skew relative to the leading signal edge of said data signal, and to identify a second delayed clock signal having a least amount of skew relative to the trailing signal edge of said data signal.

3. The apparatus of claim 2, wherein said data signal is preceded by first and second preamble portions, each portion having leading and trailing signal edges separated by a single clock cycle, and wherein said detector means compares said plurality of delayed clock signals to said first preamble portion to identify said first delayed clock signal, and said detector means compares said plurality of delayed clock signals to said second preamble portion to identify said second delayed clock signal.

4. A double-edge de-skewer apparatus for reducing skew in a communication channel having first and second communication lines, said apparatus comprising:

a first input for receiving a clock signal along a first communication line;

a second input for receiving a data signal along a second communication line, wherein data received along said second communication line is skewed with respect to the clock signal received along said first communication line, said data signal having first and second preambles each providing a leading signal edge and a trailing signal edge separated by a single clock cycle;

a plurality of sequentially connected delay elements connected to said first communication line, each delay element providing a respective delayed clock signal, whereby said clock signal is delayed by increasing amounts as said clock signal is transmitted through said sequentially arranged delay elements;

a detector, connected to said delay elements, for identifying a delay element providing a delayed clock signal having a least amount of skew with respect to a signal edge of said data signal;

a controller for controlling operation of said detector to identify a first de-skewed signal comprising an output of a first said delay element having a least amount of skew relative to the leading signal edge in said first preamble and a second de-skewed signal comprising an output of a second said delay element having a least amount of skew relative to the trailing signal edge in said second preamble;

a first multiplexer, having inputs connected to said delay line elements, to said controller means and to said detector circuit for outputting said first de-skewed signal; and a second multiplexer, having inputs connected to said delay line elements, to said controller means, and to said detector circuit for outputting said second de-skewed signal.

5. The double-edged de-skewer of claim 4, further including:

inverter elements coupled to respective said delay elements for providing inverted delayed clock signals output from each of said delay elements;

a clock multiplexer, connected to said delay elements, to outputs of said inverter elements, and to said controller for outputting delayed clock signals corresponding to said first preamble and for outputting inverted delayed clock signals corresponding to said second preamble.

6. The double-edged de-skewer of claim 4, wherein said detector means includes:

a plurality of flip-flop circuits operably connected between said delay elements and said detector, each said flip-flop circuit having a first input connected to an output of a respective delay element, and a second input coupled to receive said data signal from said second communication line.

7. An apparatus for reducing skew in a communication channel having first and second communication lines, said apparatus comprising:

a first input coupled to receive a first signal along said first communication line, said first signal including a clock pulse having a leading edge and a trailing edge;

a second input coupled to receive a second signal along said second communication line, said second signal including a synchronization pulse having a leading edge and a trailing edge;

a delay line coupled to said first input for delaying said first signal so as to generate a plurality of delayed signals each including a clock pulse having a leading edge and a trailing edge corresponding to but delayed by a respective amount from the clock pulse of said first signal;

a comparator coupled to said second input and said delay line, for comparing said delayed signals with said second signal to identify a said delayed signal having a least amount of skew with respect to said second signal by determining, at the leading edge of the clock pulse of each said delayed signal, whether said synchronization pulse of said second signal is between the leading and trailing edges of that clock pulse; and an output selector outputting a clock signal synchronized with the clock pulse of the delayed signal identified by the comparator, said output selector being coupled to said comparator.

8. An apparatus as claimed in claim 7, wherein:

said delay line comprises a plurality of sequentially connected delay elements coupled to said first communication line, each delay element providing a delay to said first signal, whereby said first signal is delayed by increasing amounts as said first signal is transmitted through said sequentially connected delay elements, each said delayed signal being provided from the output of a respective said delay element; and said comparator comprises:

a plurality of edge-triggered flip-flop circuits, each having a clocking input coupled to receive a respective said delayed signal from said delay line, and a data input coupled to receive said second signal; and a detector circuit coupled to receive output signals from said plurality of flip-flops for determining, on the basis of said output signals, the output of which delay element provides the delayed signal having the least amount of skew.

9. An apparatus as claimed in claim 8, wherein said output selector includes a multiplexer coupled to receive said plurality of delayed signals for outputting as said clock signal said delayed signal having the least amount of skew identified by said comparator.

10. An apparatus for reducing skew in a communication channel having first and second communication lines, said apparatus comprising:

a first input receiving a first signal along said first communication line, said first signal including a clock pulse having a leading edge and a trailing edge;

a second input receiving a second signal along said second communication line, said second signal including a synchronization pulse having a leading edge and a trailing edge;

a delay line delaying said first signal so as to generate a plurality of delayed signals each including a clock pulse having a leading edge and a trailing edge corresponding to but delayed by a respective amount from the clock pulse of said first signal, wherein said delay line comprises a plurality of sequentially connected delay elements coupled to said first input, each delay element providing a delay to said first signal, whereby said first signal is delayed by increasing amounts as said first signal is transmitted through said sequentially connected delay elements, each said delayed signal being provided from the output of a respective said delay element;

a comparator comparing said delayed signals with said second signal to identify a said delayed signal having a least amount of skew with respect to said second signal by determining, at the leading edge of the clock pulse of each said delayed signal, whether said synchronization pulse of said second signal is between the leading and trailing edges of that clock pulse, said comparator comprising:

a plurality of edge-triggered flip-flop circuits, each having a clocking input coupled to receive a respective said delayed signal from said delay line, and a data input coupled to receive said second signal from said second input, wherein each flip-flop circuit outputs a first output value if the leading edge of the pulse of the respective delayed signal occurs between the leading and trailing edges of the pulse of said second signal, and outputs a second value otherwise, the outputs of the flip-flop circuits providing a sequence of said first output values; and a detector coupled to receive the outputs of said plurality of flip-flops for determining the delayed signal having the least amount skew by determining the delayed signal corresponding to the flip-flop circuit which provides a median value of said sequence of first output values; and an output selector outputting a clock signal synchronized with the clock pulse of the delayed signal identified by the comparator.

11. An apparatus as claimed in claim 10, wherein said output selector includes a multiplexer coupled to receive said plurality of delayed signals and outputting as said synchronized clock signal said delayed signal having the least amount of skew determined by said detector.

12. An apparatus as claimed in claim 11, wherein said first output value corresponds to a logical value of 1 and said second output value corresponds to a logical value of 0.

13. An apparatus as claimed in claim 12, wherein said plurality of flip-flops includes N flip-flops and wherein an amount of delay provided by each said delay element is selected to ensure that no more than N=2 flip-flops outputs said first output value.

14. An apparatus for reducing skew in a communication channel having at least two communication lines, said apparatus comprising:

a first input for receiving a clock signal along a first communication line;

a second input for receiving a data signal along a second communication line, said data signal having a preamble providing a synchronization pulse having a leading edge and a trailing edge separated by a single clock cycle;

a plurality of sequentially connected delay elements coupled to said first input, each delay element providing a certain delay to said clock signal, whereby said clock signal is delayed by increasing amounts as it is transmitted through said sequentially arranged delay elements;

a plurality of primary flip-flop circuits, each having a clocking input coupled to receive output from a respective said delay element and a data input coupled to receive said data signal from said second input;

a plurality of secondary flip-flop circuits, each having a clocking input coupled to receive output from a respective said delay element and a data input coupled to receive output from a respective corresponding primary flip-flop circuit;

a detector circuit which receives an output of each secondary flip-flop circuit, wherein each said secondary flip-flop circuit outputs a first logic value to said detector circuit if a leading edge of the clock signal at the output of the corresponding respective delay element occurs between said leading and trailing edges of said synchronization pulse, and outputs a second logic value otherwise, said detector circuit including selection circuitry for selecting the output of one of said secondary flip-flop circuits which outputs said first logic value and providing a selection signal; and a multiplexer coupled to receive the output of each said delay element and said selection signal so as to output a delayed clock signal from one of said delay elements on the basis of said selection signal.

15. An apparatus for reducing skew as claimed in claim 14, wherein said delay elements and said primary flip-flop circuits are selected such that:

$$T_{d\ max} \geq (T_{clock} + T_{s\ max} + T_{h\ max})/3;\ \text{and}$$

$$T_{d\ min} \geq T_{clock}/(n+1);$$

where $T_{d\ max}$=a worst case maximum delay for any said delay element $T_{d\ min}$=a worst case minimum delay for any said delay element n=the number of sequentially connected delay elements $T_{s\ max}$=a worst case maximum set-up time for any said primary flip-flop circuit $T_{h\ max}$=a worst case maximum hold time for any said primary flip-flop circuit $T_{clock}$=a clock period.

16. A method for reducing skew in a communication channel having first and second communication lines, comprising the steps of:

receiving a first signal along said first communication line, said first signal including a clock pulse having a leading edge and a trailing edge;

receiving a second signal along said second communication line, said second signal including a synchronization pulse having a leading edge and a trailing edge;

successively delaying said first signal to generate a plurality of delayed signals each including a clock pulse having a leading edge and a trailing edge corresponding to but delayed by a respective amount from the clock pulse of said first signal;

comparing said delayed signals with said second signal to identify a said delayed signal having a least amount of skew with respect to said second signal by determining, at the leading edge of the clock pulse of each said delayed signal, whether said synchronization pulse of said second signal is between the leading and trailing edges of that clock pulse, said comparison providing a sequence of said first output values;

selecting one of said plurality of delayed signals which corresponds to a median value of said sequence of first output values; and outputting the selected one of said plurality of delayed signals as a clock signal having reduced skew with respect to said second signal.

* * * * *

UNITED STATES PATENT AND TRADEMARK OFFICE
CERTIFICATE OF CORRECTION

PATENT NO. : 5,467,464
DATED : Nov. 14, 1995
INVENTOR(S) : Florin Oprescu and Roger Van Brunt It is certified that error appears in the above-indentified patent and that said Letters Patent is hereby corrected as shown below:

Col. 19, Line 44  Delete "N=2"  Insert in place thereof --N-2--

Col. 20, Line 22  Delete "$T_{d\ max} \geq (T_{clock} + T_{s\ max} + T_{h\ max})/3$; and"

In place thereof --$T_{d\ max} \geq (T_{clock} + T_{s\ max} + T_{h\ max})/3$; and--

Col. 20, Line 23  Delete "$T_{d\ min} \geq T_{clock}/(n+1)$"

In place therof ""$T_{d\ min} \geq T_{clock}/(n+1)$" --

Signed and Sealed this

Twenty-third Day of April, 1996

Attest:

BRUCE LEHMAN

Attesting Officer

Commissioner of Patents and Trademarks